US012554210B2

(12) United States Patent
Kurita

(10) Patent No.: US 12,554,210 B2
(45) Date of Patent: Feb. 17, 2026

(54) IMAGE FORMING DEVICE

(71) Applicant: Toshiba Tec Kabushiki Kaisha, Tokyo (JP)

(72) Inventor: Suguru Kurita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/903,191

(22) Filed: Oct. 1, 2024

(65) Prior Publication Data

US 2025/0076778 A1 Mar. 6, 2025

Related U.S. Application Data

(63) Continuation of application No. 18/174,456, filed on Feb. 24, 2023, now Pat. No. 12,135,506.

(51) Int. Cl.
*G03G 15/02* (2006.01)
*G03G 15/00* (2006.01)
(Continued)

(52) U.S. Cl.
CPC ....... *G03G 15/0131* (2013.01); *G03G 15/043* (2013.01); *G03G 15/0907* (2013.01);
(Continued)

(58) Field of Classification Search
CPC ............. G03G 15/0131; G03G 15/043; G03G 15/0907; G03G 15/50; G03G 15/6558;
(Continued)

(56) References Cited

U.S. PATENT DOCUMENTS

| | | | |
|---|---|---|---|
| 11,546,484 | B2 | 1/2023 | Sato |
| 2008/0074267 | A1 | 3/2008 | Sugiyama |

(Continued)

FOREIGN PATENT DOCUMENTS

| | | | |
|---|---|---|---|
| JP | 2001-096814 | A | 4/2001 |
| JP | 2003-159838 | A | 6/2003 |
| JP | 2012-037676 | A | 2/2012 |

OTHER PUBLICATIONS

Non-Final Office Action for U.S. Appl. No. 18/174,456, dated Feb. 27, 2024.

(Continued)

*Primary Examiner* — Hoang X Ngo
(74) *Attorney, Agent, or Firm* — FOLEY & LARDNER LLP

(57) ABSTRACT

An image forming device includes a communication device that communicates with a wireless tag, and an image former that forms a developer image on a surface of a photoreceptor via a transfer belt. The image former includes a transferor that transfers the developer image from the transfer belt to a medium, and a transmitter configured to transmit the medium to the transferor. The image forming device includes a controller communicably coupled to the image former. The controller includes a processor that controls an operation of the transmitter. When communication with the wireless tag by the communication device is not ended, the controller controls the transmitter to stop the medium, and after the developer image has been transferred to the transfer belt by the image former and passes a transfer position of the transferor, transmit the medium preventing the developer image on the transfer belt from being transferred to the medium.

20 Claims, 6 Drawing Sheets

(51) Int. Cl.

*G03G 15/01* (2006.01)
*G03G 15/043* (2006.01)
*G03G 15/09* (2006.01)
*G03G 21/16* (2006.01)
*G03G 21/18* (2006.01)

(52) U.S. Cl.

CPC ......... *G03G 15/50* (2013.01); *G03G 15/6558* (2013.01); *G03G 21/169* (2013.01); *G03G 21/1882* (2013.01); *G03G 2215/1647* (2013.01)

(58) Field of Classification Search

CPC ............. G03G 21/169; G03G 21/1882; G03G 2215/1647

See application file for complete search history.

(56) References Cited

U.S. PATENT DOCUMENTS

| | | | | |
|---|---|---|---|---|
| 2018/0239289 | A1* | 8/2018 | Takada | H04N 1/00612 |
| 2021/0306512 | A1* | 9/2021 | Sato | H04N 1/32138 |
| 2022/0197733 | A1* | 6/2022 | Tomiyama | H04N 1/00342 |

OTHER PUBLICATIONS

Notice of Allowance for U.S. Appl. No. 18/174,456, dated Jul. 8, 2024.

* cited by examiner

IMAGE FORMING DEVICE

CROSS-REFERENCE TO RELATED PATENT APPLICATIONS

This application is a continuation of U.S. patent application Ser. No. 18/174,456, filed Feb. 24, 2023, the content of which is incorporated herein by reference in its entirety.

FIELD

Embodiments described herein relate generally to an image forming device.

BACKGROUND

An image forming device having a tag communication device communicating with a radio-frequency identification tag (e.g., RFID tag) which is a radio communication unit (e.g., a wireless tag). The image forming device having a tag communication device can perform a process (hereinafter, also referred to as a "tag process") such as writing data or reading data with respect to the RFID tag provided on a sheet on which an image is printed. It is desirable that the image forming device including a tag communication device is allowed to easily distinguish between sheets on which the tag process is successful and sheets on which the tag process fails.

An image forming device may discharge the sheets on which the tag process fails and the sheets on which the tag process is successful to different discharge destinations. However, after sheets are taken out from the discharge destination, it is not possible to visually distinguish between the sheets on which the tag process is successful and the sheets on which the tag process fails. Further, an image forming device can print an image indicating a writing failure on the sheets if writing data to the RFID tag fails. However, it is a complicated operation and lengthy process if an image different from an original image is required to be printed on the sheet on which writing data to the RFID tag fails.

An object of at least one embodiment is to provide an image forming device communicating with a wireless tag provided on a medium and capable of easily and visually determining a medium on which communication fails.

DETAILED DESCRIPTION

In general, according to one embodiment, an image forming device includes a communication device, an image forming unit, a transfer unit, a transmitting unit, and a processor. The communication device communicates with a wireless tag. The image forming unit forms a developer image on a surface of a photoreceptor. The transfer unit transfers the developer image to a medium having the wireless tag communicating with the communication device. The transmitting unit transmits the medium to the transfer unit. The processor controls the operation of the transmitting unit so as to transmit the medium at a first timing when communication with the wireless tag by the communication device normally executed and controls the operation of the transmitting unit so as to transmit the medium at a second timing different from the first timing when the communication with the wireless tag by the communication device is not normally ended.

Hereinafter, an image forming device according to various embodiments will be described with reference to the drawings.

First, a configuration of the image forming device 1 according to at least one embodiment will be described.

Figure 1:
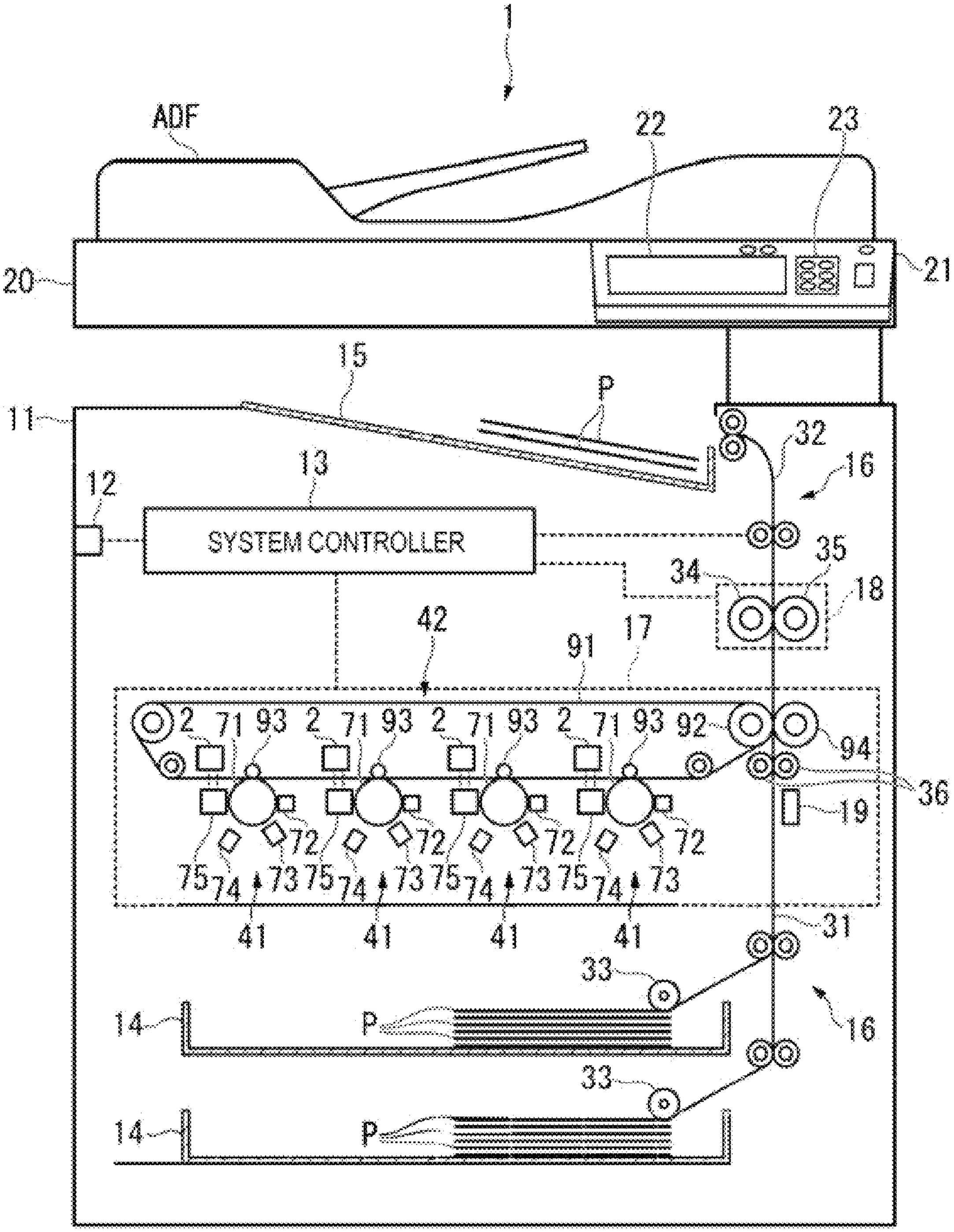
FIG. 1 is a diagram illustrating a configuration example of an image forming device according to at least one embodiment.

FIG. 1 is a diagram illustrating a configuration example of a digital multi-function peripheral (MFP) having an electrophotographic printer, which is an example of an image forming device 1 according to at least one embodiment.

The image forming device 1 (e.g., a digital MFP) according to the embodiment includes a printer forming an image on a print medium P and a tag communication device. The tag communication device communicates with an RFID (e.g., radio frequency identification) tag as a wireless tag (e.g., radio communication unit) included in the print medium P. For example, the image forming device 1 is disposed in a workplace.

The wireless tag is a small-sized radio communication unit including a processor, an internal memory, a wireless communication circuit, and an antenna. The wireless tag is, for example, an RFID tag. The wireless tag communicates with a tag communication device as a wireless communication device. The wireless tag executes a process according to a command supplied from the tag communication device, and responds to the tag communication device with an execution result. For example, if the wireless tag receives a read command, the wireless tag reads data stored in an internal memory and responds with the read data. Further, if the wireless tag receives a write command, the wireless tag writes data requested to be written into the internal memory and outputs a response indicating a write result.

The printer of the image forming device 1 prints an image on the print medium P having the wireless tag. The print medium P is, for example, a sheet. The sheet as the print medium P may have a wireless tag embedded therein or may have a wireless tag attached thereto. Hereinafter, it is assumed that the print medium P is a sheet provided with the RFID tag which is an example of the wireless tag.

However, the sheet as the print medium P may be a sheet provided with a two-dimensional code instead of being provided with the wireless tag. The two-dimensional code is, for example, a QR code (registered trademark), a bar code, or the like. In this case, the image forming device 1 is provided with a code reader reading the two-dimensional code instead of the tag communication device.

In the embodiment illustrated in FIG. 1, the image forming device 1 has a printer forming an image on the print medium P by an electrophotographic process. However, the image forming method of the image forming device 1 according to the embodiment is not limited to the electrophotographic method. The printer of the image forming device 1 in the embodiment illustrated in FIG. 1 forms an image to be developed with toner (e.g., a developer) on the print medium P. The toner may be a single color toner or may be a plurality of color toners. In addition, the toner may be a decolorable toner. FIG. 1 is a diagram illustrating an embodiment of the image forming device 1 performing an image forming process by using four color toners of yellow, magenta, cyan, and black.

In the embodiment illustrated in FIG. 1, the image forming device 1 includes a housing 11, a communication interface 12, a system controller 13, a plurality of sheet trays 14, a discharging sheet tray 15, a conveying mechanism 16, an image forming mechanism (e.g., image forming device, printer, image former, etc.) 17, a fuser 18, a scanner 20, and a control panel 21.

The housing 11 is a main body of the image forming device 1. The housing 11 accommodates, for example, the communication interface 12, the system controller 13, the plurality of sheet trays 14, the conveying mechanism 16, the image forming mechanism 17, the fuser 18, and the like. The housing 11 uses a portion of an upper surface of the housing 11 as the discharging sheet tray 15.

The communication interface 12 is an interface for communicating with other devices connected via a network. The communication interface 12 is used for communication with external devices. The external device may be a user terminal instructing a print job, a server as a management device managing information on the RFID tag provided in the print medium P or the like. The communication interface 12 is configured with, for example, a LAN (e.g., a local area network) connector or the like. The communication interface 12 may perform wireless communication with other devices according to standards such as Bluetooth (registered trademark) or Wi-Fi (registered trademark).

The system controller 13 executes control of each unit of the image forming device 1, data processing, and the like. For example, the system controller 13 is a computer including a processor, a memory, and various interfaces. The system controller 13 performs control of each unit and the data processing by the processor executing a program stored in the memory. The system controller 13 is connected to each unit of the housing 11 through various internal interfaces. For example, the system controller 13 is connected to the communication interface 12, the discharging sheet tray 15, the conveying mechanism 16, the image forming mechanism 17, the fuser 18, the scanner 20, and the like.

The system controller 13 acquires the print job including the image data or the like received from the external device via the communication interface 12. The image data included in the print job is data representing an image to be formed on the print medium P. The image data may be data for forming an image on one print medium P, or data for forming an image on a plurality of print media P.

In addition, the print job may include information indicating process details for the RFID tag provided on the print medium P. The process details for the RFID tag may be an instruction to write data to the RFID tag or an instruction to read data from the RFID tag. In addition, the print job may include information indicating a sheet discharging position (discharging sheet tray, discharge direction, or the like) for discharging the print medium P on which an image is formed. In addition, the print job may include information indicating printing conditions such as information indicating color printing or monochrome printing.

The system controller 13 includes an engine controller configured to control operations of the conveying mechanism 16, the image forming mechanism 17, and the fuser 18. For example, the system controller 13 controls conveying of the print medium P by the conveying mechanism 16. The system controller 13 controls formation of a developer image and transfer of the developer image to the print medium P by the image forming mechanism 17. The system controller 13 controls fixing of the developer image on the print medium P by the fuser 18. The system controller 13 forms an image of the image data included in the print job on the print medium P by controlling the operations of the conveying mechanism 16, the image forming mechanism 17, and the fuser 18.

It is noted that the image forming device 1 may be configured to include an engine controller in addition to the system controller 13. For example, the image forming device 1 may be provided with an engine controller controlling at least one of the conveying mechanism 16, the image forming mechanism 17, the fuser 18, and the like, separately from the system controller 13. The engine controller provided separately from the system controller 13 may acquire information necessary for controlling from the system controller 13.

The plurality of sheet trays 14 are cassettes accommodating respective print media P. The sheet tray 14 is configured to be replenished with the print medium P provided with the RFID tag. For example, the sheet tray 14 is configured to be able to be extracted from the housing 11. The sheet tray 14 is set in the housing 11 again after being replenished with the print medium P provided with the RFID tag in the extracted state.

The conveying mechanism 16 is a mechanism that conveys the print medium P within the image forming device 1. As illustrated in FIG. 1, the conveying mechanism 16 includes a plurality of conveyance paths. The conveying mechanism 16 includes a feeding sheet conveyance path 31 and a discharging sheet conveyance path 32.

The feeding sheet conveyance path 31 and the discharging sheet conveyance path 32 are configured with a plurality of rollers, a plurality of guides, and the like. The plurality of rollers convey the print medium P by rotating with power transmitted from a driving mechanism. The plurality of guides control a conveyance direction of the print medium P conveyed by the rollers.

The feeding sheet conveyance path 31 incorporates the print medium P from the sheet tray 14 and supplies the incorporated print medium P to the image forming mechanism 17. The feeding sheet conveyance path 31 includes a plurality of pickup rollers 33 corresponding to each sheet tray 14. Each pickup roller 33 transmits one print medium P picked up from the sheet tray 14 to the feeding sheet conveyance path 31.

The feeding sheet conveyance path 31 supplies the print medium P to a transfer position of an image (e.g., toner image) generated by the image forming mechanism 17 by using toner (e.g., developer). The registration roller 36 is provided in front of the transfer position on the feeding sheet conveyance path 31. The registration roller 36 transmits the print medium P fed from the sheet tray 14 to the transfer position according to the transfer timing of the image at the transfer position. For example, the registration roller 36 temporarily stops the print medium P fed from the sheet tray 14. The registration roller 36 transmits the print medium P to the transfer position at a timing according to the instruction from the system controller 13.

The discharging sheet conveyance path 32 is a conveyance path for discharging the print medium P on which an image is formed by the image forming mechanism 17 from the housing 11. The discharging sheet conveyance path 32 discharges the print medium P to the discharging sheet tray 15. The discharging sheet tray 15 is a tray for receiving the print medium P discharged from the image forming device 1. Further, if the image forming device 1 has a plurality of sheet discharging positions, the discharging sheet conveyance path 32 operates to discharge the print medium P to the sheet discharging position designated by the system controller 13.

The image forming mechanism 17 has a configuration for forming an image on the print medium P. The image forming mechanism 17 will be described later in detail.

The fuser 18 includes a heat roller 34 and a pressure roller 35. The fuser 18 heats the print medium P conveyed on the discharging sheet conveyance path 32 to a predetermined temperature by the heat roller 34. The fuser 18 further pressurizes the print medium P heated by the heat roller 34 with the pressure roller 35. The fuser 18 fixes the image (e.g., the developer image) on the print medium P to the print medium P by heating and pressurizing the print medium P.

The tag communication device 19 communicates with the RFID tag as a radio communication unit (e.g., a wireless tag) provided on the print medium P. The tag communication device 19 is provided so as to be able to communicate with the RFID tag of the print medium P in front of the registration roller 36. The tag communication device 19 supplies commands to the RFID tag by wireless communication. The tag communication device 19 receives a response from the RFID tag. The RFID tag executes a process in response to the command from the tag communication device 19 and transmits (responds with) a command execution result to the tag communication device 19.

The tag communication device 19 reads data from the RFID tag and writes data to the RFID tag according to instructions from the system controller 13. If the system controller 13 instructs the tag communication device 19 to read data from the RFID tag, the tag communication device 19 executes a process of reading the data from the RFID tag. If the system controller 13 instructs the tag communication device 19 to write data to the RFID tag, the tag communication device 19 executes a process of writing the data to the RFID tag.

The scanner 20 is a device reading a document and converting a result of the reading into image data. The scanner 20 is provided on the top of the housing 11. The scanner 20 reads an image of the document set on a document platen glass provided on the top of the housing 11. The scanner 20 also includes an automatic document feeder ADF. The scanner 20 also has a function of reading an image of a document conveyed by the automatic document feeder ADF.

The control panel 21 includes a touch panel 22, a keyboard 23, and the like. The touch panel 22 is, for example, a stack of a display such as a liquid crystal display or an organic EL (electroluminescence) display and a touch sensor detecting touch input. A display including the touch panel 22 is a display device of the image forming device 1.

The keyboard 23 has various keys for the user of the image forming device 1 to operate. For example, the keyboard 23 has numeric keys, a power key, a sheet feed key, function keys, and the like. Each key may be referred to as a button. The touch panel 22 and the keyboard 23 are input devices of the image forming device 1.

Next, a configuration of the image forming mechanism 17 will be described.

As illustrated in FIG. 1, the image forming mechanism 17 includes a plurality of image forming stations 41 and a transfer mechanism 42. Each image forming station 41 forms each toner image. Each image forming station 41 is provided for each type of toner. In the example illustrated in FIG. 1, each image forming station 41 corresponds to each color toner such as yellow, magenta, cyan, and black from the left side. Each image forming station 41 includes a toner cartridge 2 having a corresponding color toner. FIG. 1 illustrates an image forming device 1 having four image forming stations 41 respectively corresponding to four color toners of yellow, magenta, cyan and black.

Next, a configuration of each image forming station 41 will be described.

Each image forming station 41 includes a photoreceptor drum (photoreceptor) 71, a cleaner 72, a charger 73, an exposure unit (e.g., an exposure device) 74, a developing unit (e.g., a developer) 75, and a primary transfer roller (e.g., a transfer unit).

The photoreceptor drum 71 includes a cylindrical drum and a photosensitive layer formed on the outer peripheral surface of the drum. The photoreceptor drum 71 is a photoreceptor. The outer peripheral surface of the photoreceptor drum 71 is an image carrier. The photoreceptor drum 71 rotates at a constant speed by power transmitted from the driving mechanism.

The cleaner 72 has a blade that is in contact with the surface of the photoreceptor drum 71. The cleaner 72 removes the toner remaining on the surface of the photoreceptor drum 71 by using the blade.

The charger 73 uniformly charges the surface of the photoreceptor drum 71. The charger 73 is also referred to as a charging charger. The charger 73 applies a grid bias voltage (e.g., a charging potential) output from a grid electrode to the photoreceptor drum 71 to uniformly charge the photoreceptor drum 71 to a uniform negative potential (e.g., a surface potential).

The exposure unit (e.g., an exposure device) 74 has a plurality of light emitting elements. The light emitting element is, for example, a laser diode (e.g., LD), a light emitting diode (e.g., LED), an organic EL (e.g., OLED), or the like. The plurality of light emitting elements are arranged in a main scanning direction that is a direction parallel to a rotation axis of the photoreceptor drum 71. Each light emitting element is configured so as to irradiate one point on the photoreceptor drum 71 with the light.

The exposure unit (e.g., an exposure device) 74 irradiates the surface of the charged photoreceptor drum 71 with the light from the plurality of light emitting elements arranged in the main scanning direction to form one line of the electrostatic latent image on the photoreceptor drum 71. Furthermore, the exposure unit 74 continuously irradiates the rotating photoreceptor drum 71 with the light to form a plurality of lines of the electrostatic latent image.

The developing unit (e.g., a developer) 75 is a device allowing toner to adhere to the photoreceptor drum 71. The developing unit 75 (e.g., a developer) contains a developer containing toner and carrier. The developing unit (e.g., a developer) 75 stirs the toner and carrier supplied from the toner cartridge 2 by a stirring mechanism. The developing unit (e.g., a developer) 75 supplies toner to the photoreceptor drum 71 from the developing roller to which the developer, containing the toner and the carrier, is stirred by the stirring mechanism adheres. The developing unit 75 develops the electrostatic latent image on the photoreceptor drum 71 with the toner by supplying the toner to the photoreceptor drum 71. The photoreceptor drum 71 holds the toner image (e.g., developer image) developed with the toner by the developing unit 75. The photoreceptor drum 71 rotates to transmit the toner image to the transfer position on the transfer belt 91.

The transfer mechanism 42 transfers the toner image formed on the surface of the photoreceptor drum 71 to the print medium P. In the configuration example illustrated in FIG. 1, the transfer mechanism 42 includes the transfer belt (transfer member) 91, a driving roller 92, a plurality of primary transfer rollers (transfer units) 93, and a secondary transfer roller 94.

The transfer belt 91 is a medium (e.g., a transfer member) to which the toner image formed on the surface of the photoreceptor drum 71 in each image forming station 41 is transferred. The transfer belt 91 is an intermediate transfer member that holds an image to be transferred to the print medium P. In the embodiment illustrated in FIG. 1, the transfer belt 91 is an endless belt wound around the driving roller 92 and a plurality of winding rollers. The back surface that is an inner face of the transfer belt 91 is in contact with the driving roller 92 and the plurality of winding rollers. The surface that is an outer face of the transfer belt 91 faces the photoreceptor drum 71 in each image forming station 41.

The driving roller 92 is rotated by power transmitted from the driving mechanism. The driving roller 92 conveys the transfer belt 91 by rotating. In the embodiment illustrated in FIG. 1, the driving roller 92 rotates counterclockwise. The transfer belt 91 which is an endless belt is conveyed so as to rotate counterclockwise by the rotation of the driving roller 92. The plurality of winding rollers are configured to be freely rotatable. The plurality of winding rollers rotate as the transfer belt 91 is moved by the driving roller 92.

The plurality of primary transfer rollers 93 are provided for each image forming station 41. Each primary transfer roller 93 is provided so as to face the photoreceptor drum 71 of the corresponding image forming station 41. Each primary transfer roller 93 is provided at a position facing the photoreceptor drum 71 of the corresponding image forming station 41 with the transfer belt 91 interposed therebetween. The position at which the primary transfer roller 93 faces the photoreceptor drum 71 with the transfer belt 91 interposed therebetween is referred to as a primary transfer portion. At the primary transfer portion, the image (toner image) on the photoreceptor drum 71 is transferred to the transfer belt 91.

The primary transfer roller 93 is in contact with the inner peripheral surface of the transfer belt 91. The primary transfer roller 93 presses the transfer belt 91 from the inner peripheral surface side toward the photoreceptor drum 71. The surface (e.g., outer peripheral surface) of the transfer belt 91 pressed by the primary transfer roller 93 comes into contact with the photoreceptor drum 71. If transferring the image (e.g., the toner image) from the photoreceptor drum 71, the primary transfer roller 93 applies a transfer bias (e.g., a primary transfer bias) to the photoreceptor drum 71 via the transfer belt 91. The toner image from the photoreceptor drum 71 is transferred to the transfer belt 91 by the transfer bias applied from the primary transfer roller 93.

The secondary transfer roller 94 is provided at a position facing the driving roller 92. The secondary transfer roller 94 is in contact with the surface of the transfer belt 91 of which the inner peripheral surface is conveyed by the driving roller 92. The secondary transfer roller 94 presses the transfer belt 91 toward the driving roller 92 side. The surface of the transfer belt 91 interposed between the driving roller 92 and the secondary transfer roller 94 is in close contact with the secondary transfer roller 94. A transfer nip is formed at which the surface of the transfer belt 91 and the secondary transfer roller 94 are in close contact with each other. The transfer nip is a transfer portion (e.g., a transfer position) at which the toner image (e.g., developer image) formed on the surface of the transfer belt 91 is transferred to the print medium P.

The secondary transfer roller 94 conveys the print medium P supplied by the registration roller 36 in the state of interposing the print medium P between the secondary transfer roller 94 and the transfer belt 91. The print medium P passes through the transfer nip (e.g., transfer position). The secondary transfer roller 94 presses the print medium P passing through the transfer nip against the surface of the transfer belt 91.

The secondary transfer roller 94 applies a bias voltage (e.g., a secondary transfer bias) to the transfer belt 91 through the print medium P at the transfer nip. The secondary transfer roller 94 applies the secondary transfer bias (hereinafter, also simply referred to as a "transfer bias") having a potential designated by the system controller 13. If the print medium P passes through the transfer nip in the state where the secondary transfer roller 94 applies the transfer bias, the toner image on the transfer belt 91 is transferred to the print medium P.

In this manner, the transfer mechanism 42 transfers (e.g., primarily transfers) the toner image on the photoreceptor drum 71 to the transfer belt 91 that is in contact with the photoreceptor drum 71 by the transfer bias applied from the primary transfer roller 93 at the primary transfer portion. If the plurality of image forming stations 41 are provided, the transfer mechanism 42 primarily transfers the toner images from the photoreceptor drums 71 of the plurality of image forming stations 41 to the transfer belt 91.

The transfer mechanism 42 transmits the toner image primarily transferred to the surface of the transfer belt 91 to the transfer nip (e.g., transfer position). The transfer mechanism 42 transfers the toner image transferred to the surface of the transfer belt 91 to the print medium P passing through the transfer nip to which the secondary transfer roller 94 applies the transfer bias. The transfer belt 91 is an example of an image carrier that holds the toner image to be transferred to the print medium P.

Next, the configuration of the control system in the image forming device 1 according to the embodiment will be described.

Figure 2:
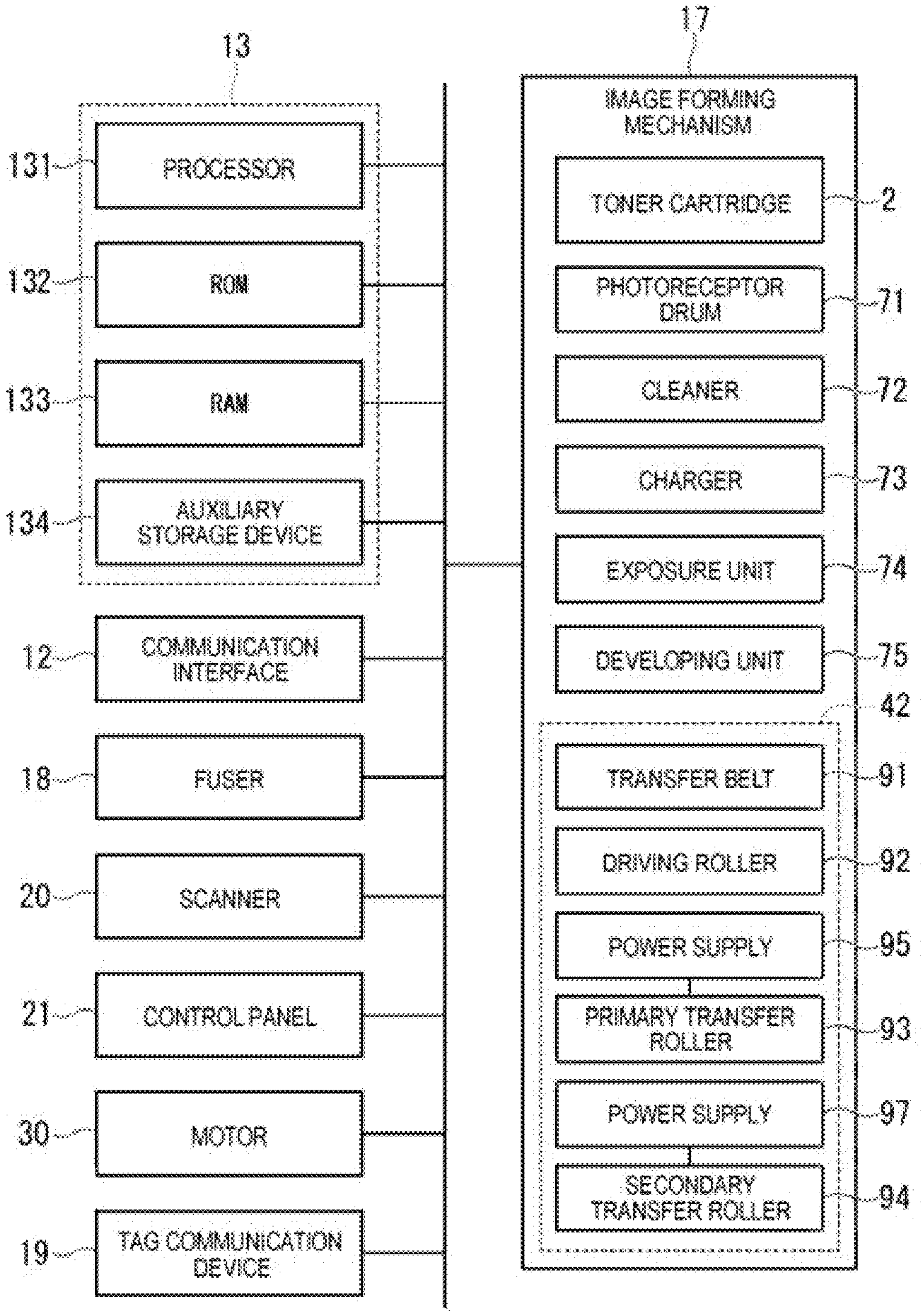
FIG. 2 is a block diagram illustrating a configuration example of a control system in the image forming device.

FIG. 2 is a block diagram illustrating an embodiment of the control system in the image forming device 1.

As illustrated in FIG. 2, the image forming device 1 connects the communication interface 12, the image forming mechanism 17, the fuser 18, the tag communication device 19, the scanner 20, the control panel 21, a motor 30, and the like to the system controller 13.

The system controller 13 includes a processor 131, a ROM (e.g., a read only memory) 132, a RAM (e.g., a random access memory) 133, and an auxiliary storage device 134 (e.g., a non-transient storage medium). The system controller 13 constitutes a computer with the processor 131, the ROM 132, the RAM 133, and the auxiliary storage device 134. In addition, the system controller 13 may also include an ASIC (e.g., an application specific integrated circuit) which is a processor for the image processing.

The processor 131 corresponds to a central portion of the computer as the system controller 13. The processor 131 controls each unit of the image forming device 1 according to an operating system or application programs. The processor 131 is, for example, a CPU (e.g., a central processing unit).

The ROM 132 and the RAM 133 correspond to a main memory unit of the computer as the system controller 13.

The ROM 132 is a non-volatile memory area, and the RAM 133 is a volatile memory area. The ROM 132 stores an operating system or application programs. The ROM 132 stores control data necessary for the processor 131 to execute a process for controlling each unit. The RAM 133 is used as a work area in which data is appropriately rewritten by the processor 131. The RAM 133 has a work area for storing, for example, image data.

The auxiliary storage device 134 (e.g., a non-transient storage medium) corresponds to an auxiliary storage portion of the computer as the system controller 13. The auxiliary storage device 134 is configured with, for example, a storage device such as an EEPROM (registered trademark) (e.g., an electric erasable programmable read-only memory), an HDD (e.g., a hard disc drive), or an SSD (e.g., a solid state drive). The auxiliary storage device 134 stores data, such as setting data used, if the processor 131 performs various processes. The auxiliary storage device 134 stores data generated in a process executed by the processor 131. The auxiliary storage device 134 may store application programs.

The system controller 13 is connected to the toner cartridge 2, the photoreceptor drum 71, the cleaner 72, the charger 73, the exposure unit 74, and the developing unit 75 in each image forming station 41. The system controller 13 controls the toner cartridge 2, the photoreceptor drum 71, the cleaner 72, the charger 73, the exposure unit 74, and the developing unit 75.

For example, the system controller 13 controls ON/OFF of charging of the charger 73 in each image forming station 41. Further, for example, the system controller 13 controls on/off of irradiation (exposure) of laser light to the photoreceptor drum 71 by the exposure unit 74 in each image forming station 41. In addition, for example, the system controller 13 controls on/off of the developing bias for the developing unit 75 in each image forming station 41.

The system controller 13 is connected to the transfer mechanism 42. The transfer mechanism 42 includes the transfer belt 91, the driving roller 92, the plurality of primary transfer rollers 93, the secondary transfer roller 94, a power supply 95, and a power supply 97. The plurality of primary transfer rollers 93 are primary transfer rollers provided in the respective image forming stations 41.

The system controller 13 is connected to the registration roller 36. For example, the system controller 13 controls on/off of transmitting the print medium P to the transfer position by the registration roller 36 according to the result of the tag process for the RFID tag of the print medium P. The registration roller 36 transmits the print medium P to the transfer position at timing based on instructions from the system controller 13.

The power supply 95 supplies a transfer bias (primary transfer bias) that the primary transfer roller 93 applies to the facing photoreceptor drum 71 with the transfer belt 91 interposed therebetween. The power supply 95 may be a current source or a voltage source.

The power supply 95 is connected to the system controller 13. The system controller 13 controls on/off of the primary transfer bias applied by the primary transfer rollers 93 to the facing photoreceptor drums 71 through the power supply 95. The system controller 13 controls the value of the primary transfer bias applied by the primary transfer roller 93 from the power supply 95.

The power supply 97 supplies a transfer bias (secondary transfer bias) that the secondary transfer roller 94 applies to the facing driving roller 92 with the transfer belt 91 interposed therebetween. The power supply 97 is connected to the system controller 13. The system controller 13 controls the value of the bias voltage (e.g., secondary transfer bias) that the secondary transfer roller 94 applies to the transfer belt 91 by the power supply 97. For example, the system controller 13 determines the value of the transfer bias based on the transfer setting according to the result of the process for the RFID tag of the print medium P. In addition, the system controller 13 may adjust the value of the bias voltage (e.g., the secondary transfer bias) according to a basis weight, thickness, type, or the like of the print medium P.

The motor 30 is a motor that operates each unit. The motor 30 is connected to the system controller 13. The motor 30 is driven under the control from the system controller 13. The motor 30 includes, for example, a first motor, a second motor, and a third motor. The first motor as the motor 30 drives the conveying mechanism 16. The second motor as the motor 30 rotates the photoreceptor drum 71. The third motor as the motor 30 rotates the driving roller 92. The plurality of second motors are provided corresponding to the photoreceptor drums 71 respectively provided in the plurality of image forming stations 41. The motor 30 may include motors other than the first, second and third motors.

Next, a configuration of an image forming system 200 having the image forming device 1 and the server 201 according to at least one embodiment will be described.

The image forming device 1 having the above-described configuration may be operated in the image forming system 200 connected to the server 201. For example, the server 201 operates as a management device managing the data recorded in the RFID tag of the print medium P in order to manage the print medium P. The server 201 may instruct the data to be written in the RFID tag of the print medium P by the image forming device 1.

The server 201 saves the data written in the RFID tag of the print medium P by the image forming device 1 together with information such as the date and time and the like, so that the history of process of the print medium P can be managed. In addition, the server 201 acquires the data read from the RFID tag of the print medium P by the image forming device 1. The server 201 saves the data read from the RFID tag of the print medium P by the image forming device 1 together with information such as the date and time, so that the history of process of the print medium P can be managed.

Figure 3:
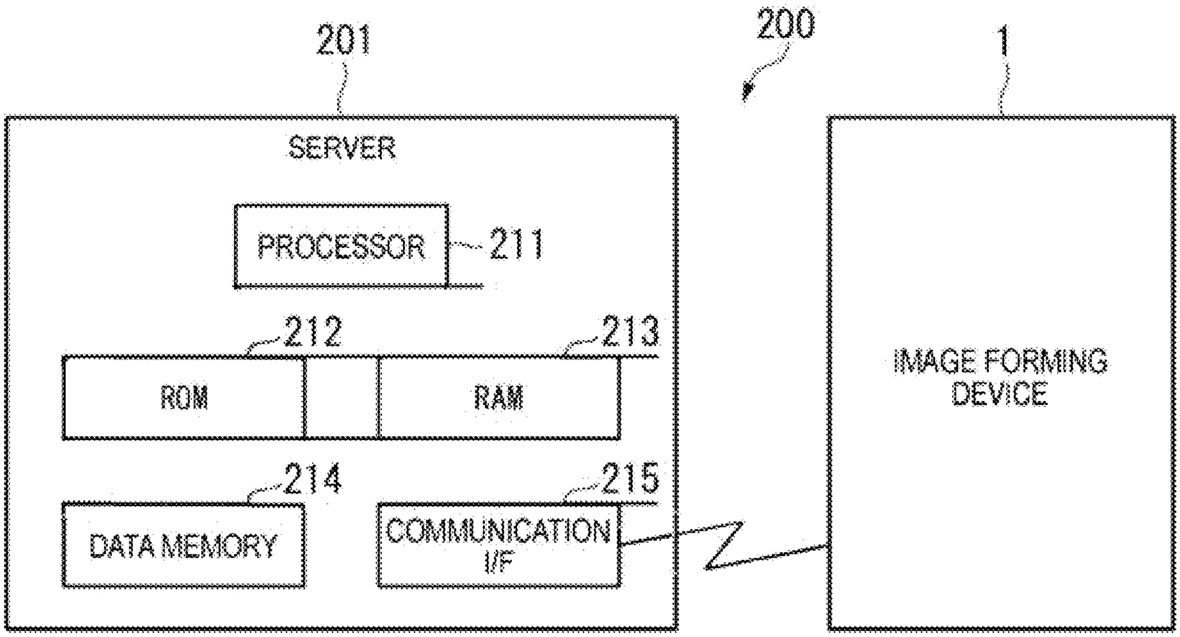
FIG. 3 is a diagram illustrating a configuration example of an image forming system including the image forming device.

FIG. 3 is a block diagram illustrating a configuration example of the image forming system 200 having the image forming device 1 and the server 201 according to the embodiment.

In the configuration example illustrated in FIG. 3, the image forming device 1 is a digital multi-function peripheral having the same configuration as illustrated in FIGS. 1 and 2. In addition, in the configuration example illustrated in FIG. 3, the server 201 includes a processor 211, a ROM (e.g., read only memory) 212, a RAM (e.g., random access memory) 213, a data memory 214, and a communication interface 215.

The processor 211 corresponds to a core portion of the computer as the server 201. The processor 211 is, for example, a CPU (e.g., central processing unit). The processor 211 executes various processes by executing programs. For example, the processor 211 executes an operating system or application programs.

The ROM 212 and RAM 213 correspond to a main memory unit of the computer as the server 201. The ROM 212 is a non-volatile memory area. The RAM 213 is a volatile memory area. The ROM 212 stores, for example, an operating system or application programs. The ROM 212 stores control data necessary for the processor 211 to execute a process for controlling each unit. The RAM 213 is used as a work area in which data is appropriately rewritten by the processor 211. The RAM 213 has a work area for storing, for example, image data.

The data memory 214 corresponds to an auxiliary memory unit of the computer serving as the server 201. The data memory 214 is configured with a storage device such as an EEPROM (e.g., electric erasable programmable read-only memory), an HDD (e.g., hard disc drive), or an SSD (e.g., solid state drive). The data memory 214 stores data such as setting data used if the processor 211 performs various processes. The data memory 214 stores data generated in a process executed by the processor 211. The data memory 214 may store application programs.

The data memory 214 may store information stored in the RFID tag provided in the print medium P processed by the image forming device 1. For example, the data memory 214 may store the data written to the RFID tag of the print medium P by the image forming device 1 together with information such as date and time. In addition, the server 201 may store the data read from the RFID tag of the print medium P by the image forming device 1 together with information such as date and time.

The communication interface 215 is an interface for communicating with other devices connected via a network. The communication interface 215 is used for communication with the image forming device 1. The communication interface 215 is, for example, an interface for LAN communication. Further, the communication interface 215 may be an interface performing wireless communication with other devices according to standards such as Bluetooth (registered trademark) or Wi-Fi (registered trademark).

Next, the image forming process and the tag process for the print medium P provided with the RFID tag in the image forming device 1 according to at least one embodiment will be described.

The image forming device 1 executes an image forming process for printing an image on the print medium P and a process (tag process) for the RFID tag of the print medium P as a process for one print job.

The system controller 13 of the image forming device 1 controls the timing of conveying the print medium P to the transfer position by the registration roller 36 according to the result of the tag process in the image forming process. In the image forming process, the system controller 13 of the image forming device 1 controls on/off of the light irradiation (e.g., exposure) on the photoreceptor drum 71 by the exposure unit 74 according to the result of the tag process. The system controller 13 of the image forming device 1 controls the value of the bias voltage (e.g., secondary transfer bias) applied to the transfer belt 91 by the secondary transfer roller 94 according to the result of the tag process in the image forming process.

If it is determined that the tag process fails, the system controller 13 of the image forming device 1 switches off the conveying operation of the print medium P by the registration roller 36 to temporarily stop the conveying operation. After the toner image transferred to the transfer belt 91 passes the transfer position of the feeding sheet conveyance path 31, the system controller 13 controls the registration roller 36 so that the print medium P on which the tag process fails passes the transfer position.

Accordingly, with the image forming device 1 of the present embodiment, image formation is not performed on the print medium P on which the tag process fails. The print medium on which such an image is not formed can clearly indicate to the user that it is the print medium P on which the process for the RFID tag fails. The user can easily recognize that it is the print medium P on which the process for the RFID tag fails by simply visually confirming that no image is formed on the print medium P.

Figure 4:
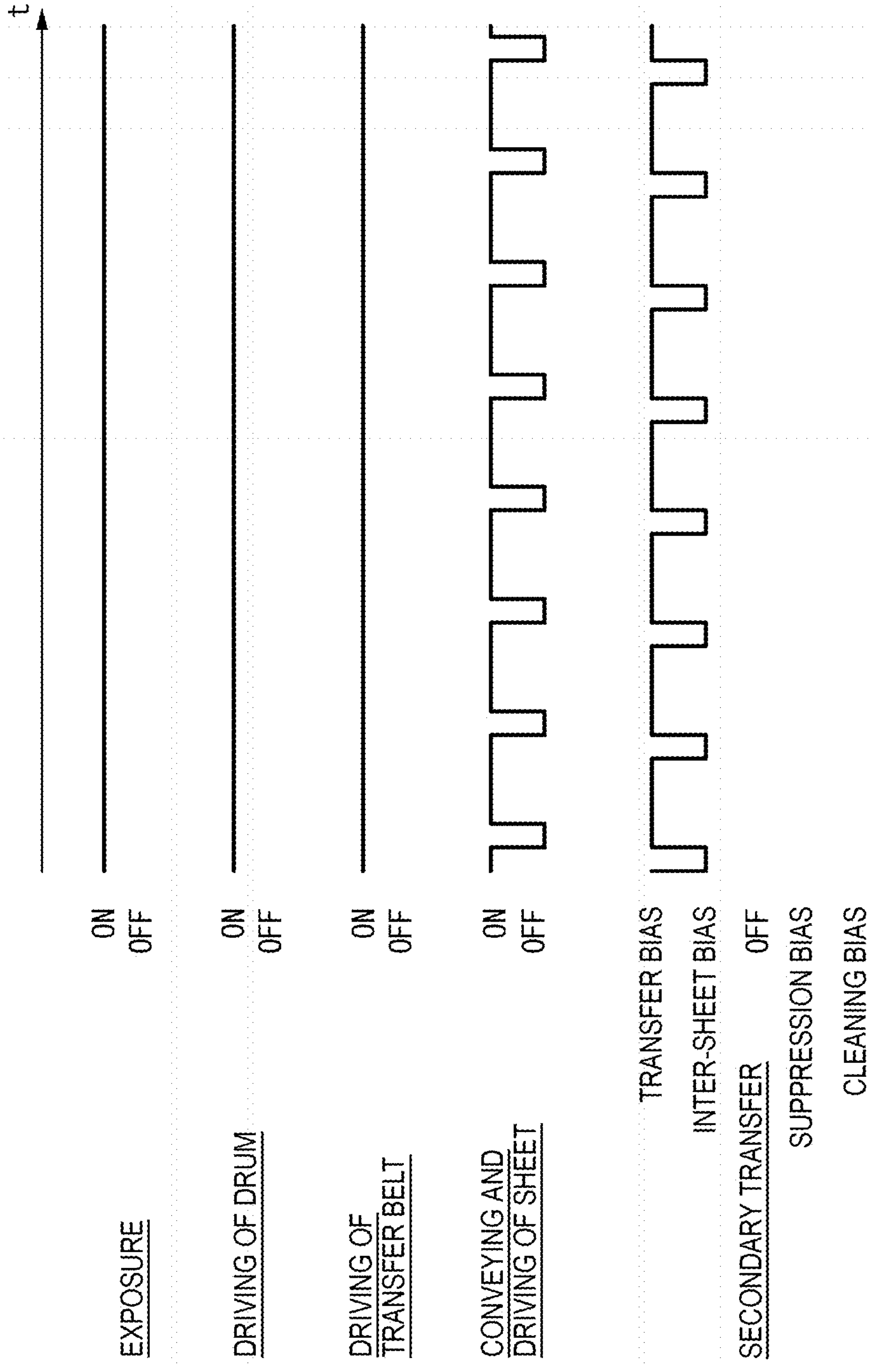
FIG. 4 is a timing chart illustrating an operation timing when a tag process of the image forming device is successful.

FIG. 4 is a timing chart illustrating the operation timing of each configuration unit of the image forming device 1 if the tag process is successful.

As illustrated in FIG. 4, while the tag process is successful, operation of the exposure unit 74 is always in the ON state. For example, the exposure unit 74 constantly performs exposure to the photoreceptor drum 71 while the tag process is successful. Further, while the tag process is successful, the driving of the photoreceptor drum 71 is always in the ON state. For example, while the tag process is successful, the photoreceptor drum 71 is constantly rotated at a constant speed by power transmitted from the driving mechanism. Further, while the tag process is successful, the driving of the transfer belt 91 is always in the ON state. For example, while the tag process is successful, the transfer belt 91 is constantly conveyed by the driving roller 92 rotated by the power transmitted from the driving mechanism.

In addition, as illustrated in FIG. 4, while the tag process is successful, the conveying and driving of the sheet by the registration roller 36 is always in an execution state. For example, while the tag process is successful, the on and off switching operation of the registration roller 36 is always performed at predetermined intervals to transmit the print medium P to the transfer position in accordance with the transfer timing.

In addition, as illustrated in FIG. 4, while the tag process is successful, control of the bias voltage (secondary transfer bias) applied to the transfer belt 91 by the secondary transfer roller 94 is always executed. For example, while the tag process is successful, the switching operation between the transfer bias and the inter-sheet bias is always performed by the secondary transfer roller 94 at predetermined intervals in accordance with the transfer timing. The transfer bias is a bias voltage for transferring the toner image from the transfer belt 91 to the print medium P, and the inter-sheet bias is a bias voltage while the print medium P is conveyed from the registration roller 36 to the transfer position.

Figure 5:
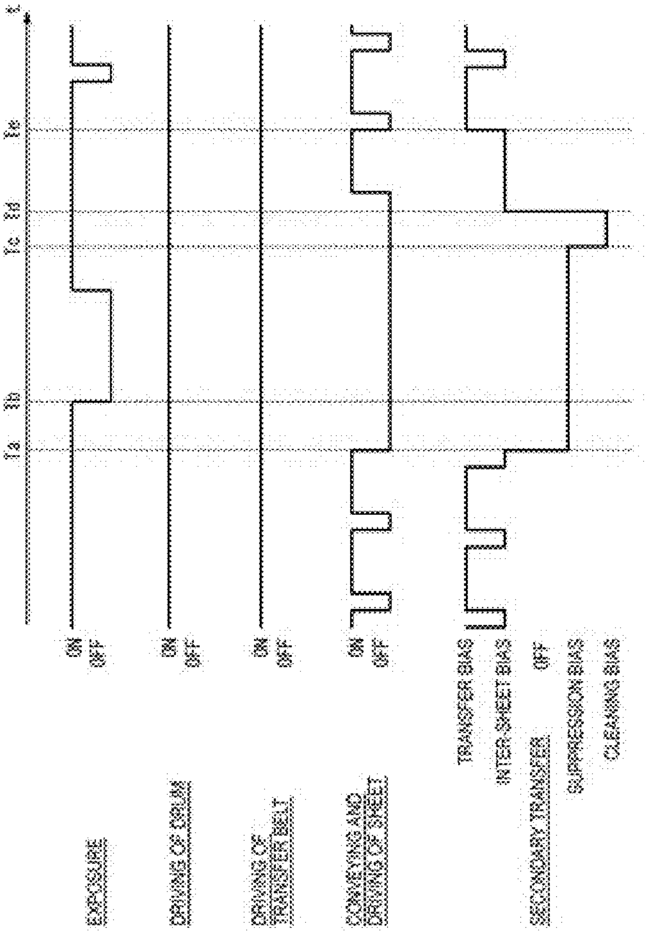
FIG. 5 is a timing chart illustrating an operation timing when the tag process of the image forming device fails.

FIG. 5 is a timing chart illustrating the operation timing of each configuration unit of the image forming device 1 if the tag process fails.

In FIG. 5, the time point Ta is a timing at which the tag process for the RFID tag of the print medium P by the tag communication device 19 fails. As illustrated in FIG. 5, if the tag process fails, the system controller 13 turns conveying and driving of the sheet by the registration roller 36 to the Off state. For example, if the tag process fails, the system controller 13 temporarily stops the operation of the registration roller 36 that transmits the print medium P to the transfer position at predetermined intervals in accordance with the transfer timing.

In this manner, the system controller 13 allows the timing at which the registration roller 36 feed the print medium P to the transfer position to be different according to the result of the tag process for the RFID tag of the print medium P by the tag communication device 19.

In addition, as illustrated in FIG. 5, if the tag process fails, the system controller 13 sets the bias voltage (e.g., secondary transfer bias) applied to the transfer belt 91 by the secondary transfer roller 94 to be in the suppression bias state. The suppression bias is a bias voltage that the toner is hard to adhere to the transfer belt 91.

In addition, as illustrated in FIG. 5, the system controller 13 switches off exposure by the exposure unit 74 at the timing of the time point Tb after the time point Ta at which the tag process fails. For example, the time point Tb is a timing at which the printing process on the print medium P (for example, the one-time previous print medium P) being executed at the time point Ta is ended. It is noted that the time point Tb may be a timing at which the tag process for the RFID tag of the print medium P by the tag communication device 19 fails. For example, the time point Tb may be the same time as the time point Ta.

In FIG. 5, the time point Tc is a timing at which the trailing portion of the toner image which becomes the latent image formed by the exposure by the exposure unit 74 performing up to the time point Tb and is transferred to the transfer belt 91 reaches the transfer position. As illustrated in FIG. 5, if the trailing portion of the toner image on the transfer belt 91 reaches the transfer position of the feeding sheet conveyance path 31, the system controller 13 sets the bias voltage (e.g., secondary transfer bias) applied to the transfer belt 91 by the secondary transfer roller 94 to be in the cleaning bias state. The cleaning bias is a bias voltage for cleaning the secondary transfer roller 94 by scraping the toner image attached to the secondary transfer roller 94 toward the transfer belt 91 side according to the potential difference.

It is noted that, as described above, the image forming device 1 of the embodiment has a configuration of not transferring the toner image to the print medium P if the tag process fails. Therefore, in the image forming device 1 of the embodiment, since the toner image remains without being transferred to the print medium P if the tag process fails, the process of cleaning the secondary transfer roller 94 is required.

It is noted that, after that, the toner scraped on the transfer belt 91 is scraped off by a cleaning blade provided for removing the toner on the transfer belt 91. The cleaning blade is provided, for example, at a position before the transfer belt 91 passes the yellow image forming station 41.

It is noted that, if the image forming device 1 has a separation function that can separate the transfer belt 91 from the photoreceptor drum 71, the separation may be performed at the timing of the time point Ta at which the tag process fails. Accordingly, the transfer of the toner image on the transfer belt 91 can be stopped earlier than the time point Tb at which the exposure is turned off. Therefore, the time point Tc at which the trailing portion of the toner image on the transfer belt 91 reaches the transfer position of the feeding sheet conveyance path 31 becomes an earlier timing, and thus, the processing time is shortened.

In FIG. 5, the time point Td is a timing at which the cleaning of the secondary transfer roller 94 being started at the time point Tc is completed. As illustrated in FIG. 5, if the cleaning of the secondary transfer roller 94 is completed, the system controller 13 allows a bias voltage (e.g., secondary transfer bias) applied to the transfer belt 91 by the secondary transfer roller 94 to be in the inter-sheet bias state.

In addition, if the cleaning of the secondary transfer roller 94 is completed, the system controller 13 returns the conveying and driving of the sheet by the registration roller 36 to the ON state. For example, if the cleaning of the secondary transfer roller 94 is completed, the system controller 13 restarts the operation of the registration roller 36 transmitting the print medium P to the transfer position at predetermined intervals in accordance with the transfer timing.

Therefore, the print medium P of which the conveying is temporarily stopped at the position of the registration roller 36 and of which the tag process fails is transmitted to the transfer position of the feeding sheet conveyance path 31. However, since the toner image transferred to the transfer belt 91 has already passed the transfer position of the feeding sheet conveyance path 31, the toner image is not transferred to the print medium P on which the tag process fails.

In this manner, the system controller 13 controls the operation of the registration roller 36 so as to transmit the print medium P to the transfer position at the timing at which the toner image on the transfer belt 91 is transferred to the print medium P if the tag process is successful. Further, the system controller 13 controls the operation of the registration roller 36 so as to transmit the print medium P to the transfer position at the timing at which the toner image on the transfer belt 91 is prevented from being transferred to the print medium P if the tag process fails.

In FIG. 5, the time point Te is a timing at which the print medium P on which the tag process fails passes the transfer position of the feeding sheet conveyance path 31. As illustrated in FIG. 5, if the print medium P on which the tag process fails passes the transfer position, the system controller 13 allows the secondary transfer roller 94 to restart the switching operation between the transfer bias and the inter-sheet bias executed at predetermined intervals according to the transfer timing.

The subsequent operation timings of the configuration units of the image forming device 1 become the normal operation timings when the tag process is successful again.

It is noted that the timing at which the system controller 13 returns the exposure by the exposure unit 74 to the ON state may be a timing before the timing of forming a latent image for forming an image on the print medium P next to the print medium P on which the tag process fails. For example, the timing at which the system controller 13 returns the exposure by the exposure unit 74 to the ON state is a time point obtained backward from the timing of the secondary transfer performed after the time point Te. In the timing chart illustrated in FIG. 5, the timing at which the system controller 13 returns the exposure by the exposure unit 74 to the ON state is set to the time point between the time point Tb and the time point Tc.

It is noted that, since the image forming device 1 according to the present embodiment is configured not to print on the print medium P on which the tag process fails, the timing for returning the exposure by the exposure unit 74 to the ON state is set as described above. However, the image forming device 1 may be configured to print a specific image on the print medium P on which the tag process fails. The specific image is, for example, an image for allowing the user to recognize that the tag process fails. In this case, the system controller 13 may return the exposure by the exposure unit 74 to the ON state by the time point Td which is a timing at which the cleaning of the secondary transfer roller 94 is completed.

Next, the image forming process (e.g., printing process) for the print medium P provided with the RFID tag in the image forming device 1 according to the embodiment will be described.

Figure 6:
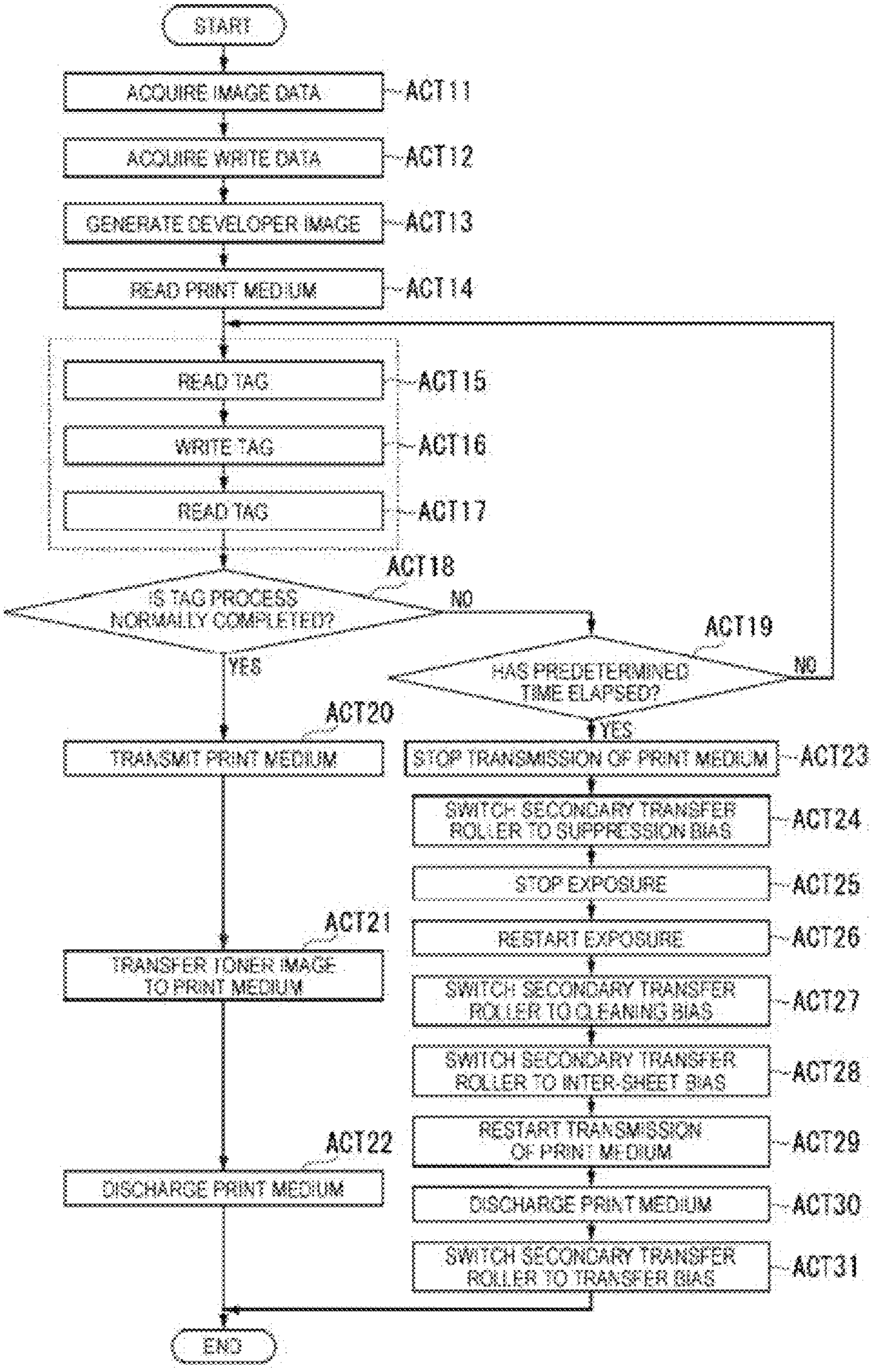
FIG. 6 is a flowchart illustrating an operation example of a printing process including the tag process in the image forming device.

FIG. 6 is a flowchart illustrating the flow of process for the print medium P provided with the RFID tag in the image forming device 1 according to the embodiment.

The image forming device 1 receives a print job received from an external device connected to the communication interface 12 or a print job input to the control panel 21. Herein, it is assumed that the image forming device 1 receives from an external device a print job including the tag process and the image forming process for the print medium P provided with the RFID tag. In addition, in a process example illustrated in FIG. 6, it is assumed that the tag process included in the print job is a write process of writing data to the RFID tag of the print medium P.

When executing the received print job, the processor 131 acquires image data to be printed on the print medium P provided with the RFID tag (ACT 11). For example, the processor 131 acquires image data received together with the print job from the external device through the communication interface 12.

The processor 131 acquires data (e.g., write data) to be written to the RFID tag of the print medium P as the tag process included in the print job (ACT 12). For example, the processor 131 acquires write data together with the print job received from the external device through the communication interface 12. The processor 131 may acquire the write data to be written to the RFID tag of the print medium P on which the image data from the external device is to be printed from the server 201.

If the processor 131 acquires the image data to be printed on the print medium P, the image forming mechanism 17 starts an image generation process to form the developer image on the transfer belt 91 (ACT 13). For example, if the image data is a color image, the processor 131 transfers the developer images of the respective colors generated by the image forming stations of the respective colors to the transfer belt 91 in a superimposition manner. In addition, if the image data is a black image, the processor 131 transfers a black developer image generated by the black image forming station to the transfer belt 91.

The processor 131 also incorporates the print medium P provided with the RFID tag for use in processing the print job to be executed (ACT 14). For example, the processor 131 incorporates the print medium P provided with the RFID tag from the sheet tray 14. The processor 131 conveys the print medium P incorporated from the sheet tray 14 to the front of the registration roller 36.

If the print medium P is conveyed to the front of the registration roller 36, the processor 131 executes the tag process for processing the RFID tag of the print medium P by using the tag communication device 19 (ACT 15 to ACT 17). In the process example illustrated in FIG. 6, the write process of writing the write data to the RFID tag is executed as the tag process.

As a write process, the processor 131 first reads information written to the RFID tag of the print medium P by the tag communication device 19 (ACT 15). For example, the processor 131 communicates with the RFID tag of the print medium P by using the tag communication device 19. The tag communication device 19 outputs a radio wave containing a command requesting a response from the RFID tag according to an instruction from the processor 131. The RFID tag within a communication range of the tag communication device 19 is booted by the radio wave from the tag communication device 19. The booted RFID tag outputs information (for example, identification information) as a response to the command included in the radio wave from the tag communication device 19. Tag communication device 19 receives the response from the RFID tag and supplies the received data to processor 131.

If the tag communication device 19 reads the RFID tag, the processor 131 requests the RFID tag to write the write data (ACT 16). For example, the tag communication device 19 outputs the radio wave including the command (e.g., write command) requesting the writing of the write data supplied from the processor 131 to the RFID tag. The RFID tag executes the process of writing the write data into the internal memory according to the write command from the tag communication device 19. If the writing of the write data is ended, the RFID tag outputs a response indicating the completion of the writing. The tag communication device 19 receives the response indicating the completion of the writing from the RFID tag and notifies the processor 131 of the end of the writing.

If the processor 131 receives the notification of the end of the writing from the tag communication device 19, the processor 131 requests the RFID tag to read the data written to the internal memory (ACT 17). For example, the tag communication device 19 outputs a radio wave containing a command (e.g., a verify read command) requesting reading of data recorded in the internal memory according to an instruction from the processor 131 to the RFID tag. The RFID tag executes reading of the data recorded in the internal memory according to the read command from the tag communication device 19. The RFID tag outputs the data read from the internal memory that is information as a response to the read command. The tag communication device 19 receives the response containing the data read from the internal memory of the RFID tag. The tag communication device 19 supplies the data received from the RFID tag to the processor 131.

If a series of the tag processes for the RFID tag of the print medium P are ended, the processor 131 determines whether or not the tag process is normally executed (ACT 18). For example, the processor 131 determines whether or not the tag process (e.g., write process) is normally ended depending on whether the write data instructed to be written matches the read data after the write process. The processor 131 determines that the write process is normally ended if the write data and the read data match each other. In addition, the processor 131 determines that the write process is not normally ended if the write data and the read data do not match each other.

If it is determined that the tag process is not normally ended (ACT 18, NO), the processor 131 determines whether it is within a predetermined time (e.g., a limited time for the tag process) (ACT 19). If it is determined that the tag process is not normally ended and it is within the predetermined time (ACT 19, YES), the processor 131 executes the processes of ACT 15 to ACT 17 again.

If it is determined that the tag process is normally ended (ACT 18, YES), the processor 131 maintains the conveying and driving of the sheet by the registration roller 36 to be in the execution state. That is, if it is determined that the tag process is normally ended, the processor 131 continues the ON/OFF switching operation of the registration roller 36 at predetermined intervals for transmitting the print medium P to the transfer position in accordance with the transfer timing. Accordingly, the processor 131 transmits the print medium P on which the tag process is normally ended to the transfer position of the feeding sheet conveyance path 31 (ACT 20).

The processor 131 transfers the toner image on the transfer belt 91 to the print medium P by passing through the transfer position (ACT 21). The processor 131 conveys the print medium P to which the toner image is transferred to the fuser 18 when passing through the transfer position. The fuser 18 fixes the transferred toner image to the print medium P by heating and pressurizing the print medium P with the heat roller 34 and the pressure roller 35.

The processor 131 conveys the print medium P to which the toner image is fixed by the fuser 18 to the discharge unit.

The processor 131 discharges the print medium P to which the toner image is fixed to a discharge position designated by the print job (ACT 22).

On the other hand, if it is determined that the tag process is not normally ended and the predetermined time elapses (ACT 19, NO), the processor 131 turns conveying and driving of the sheet by the registration roller 36 to the Off state. That is, if the tag process fails, the processor 131 temporarily stops the operation of the registration roller 36 transmitting the print medium P to the transfer position of the feeding sheet conveyance path 31 at predetermined intervals in accordance with the transfer timing (ACT 23).

The processor 131 switches the bias voltage (e.g., secondary transfer bias) applied to the transfer belt 91 by the secondary transfer roller 94 to the suppression bias state (ACT 24). After the tag process fails, the processor 131 temporarily stops exposure by the exposure unit 74 at a predetermined timing (ACT 25). The predetermined timing is, for example, a timing at which the printing process on the print medium P (for example, the previous print medium P) being executed at the time point if the tag process fails is ended.

After temporarily stopping the exposure by the exposure unit 74, the processor 131 restarts the exposure by the exposure unit 74 at a predetermined timing (ACT 26). The predetermined timing is, for example, a timing matching the timing of performing the exposure for printing an image on the print medium P next to the print medium P on which the tag process fails.

If the tailing portion of the toner image on the transfer belt 91 reaches the transfer position of the feeding sheet conveyance path 31, the processor 131 switches the bias voltage (e.g., secondary transfer bias) applied to the transfer belt 91 by the secondary transfer roller 94 to the cleaning bias state (ACT 27).

If the cleaning of the secondary transfer roller 94 is completed, the processor 131 switches the bias voltage (e.g., secondary transfer bias) applied to the transfer belt 91 by the secondary transfer roller 94 to the inter-sheet bias state. Further, if the cleaning of the secondary transfer roller 94 is completed, the processor 131 restarts the operation of the registration roller 36 transmitting the print medium P to the transfer position of the feeding sheet conveyance path 31 at predetermined intervals in accordance with the transfer timing (ACT 29).

The processor 131 conveys the print medium P on which the tag process fails without transferring the toner image to the discharge unit (ACT 30). If the print medium P on which the tag process fails passes the transfer position of the feeding sheet conveyance path 31, the processor 131 switches the bias voltage (e.g., secondary transfer bias) applied to the transfer belt 91 by the secondary transfer roller 94 to the transfer bias state (ACT 31). The processor 131 restarts the switching operation between the transfer bias and the inter-sheet bias executed by the secondary transfer roller 94 at predetermined intervals in accordance with the transfer timing. In this manner, the process for the print medium P provided with the RFID tag in the image forming device 1 illustrated in the flowchart of FIG. 6 is ended.

It is noted that the processes of ACT 15 to ACT 17 may be the processes other than the write process. The processor 131 may determine whether the tag process is normally ended depending on whether data can be normally exchanged between the tag communication device 19 and the RFID tag. If the tag process is a read process, the processor 131 determines there is an abnormality if there is no response from the RFID tag or if the response from the RFID tag is not in a normal data format.

As described above, the image forming device according to the embodiment uses a medium to which additional information is attached as a print medium. The additional information is, for example, information stored in the wireless tag provided on the medium. The image forming device is configured to control the operation of the transmitting unit (e.g. transmitter) so as to transmit the print medium at the first timing when the process for the additional information is normally executed and to control the operation of the registration roller (e.g., transmitting unit, transmitter, etc.) so as to transmit the medium at a second timing different from the first timing when the process for the additional information is not normally ended. For example, the process for the additional information is reading information stored in the wireless tag or writing information to the wireless tag. For example, the first timing is a timing at which the toner image (e.g., developer image) is allowed to be transferred to the medium by the secondary transfer roller (e.g., transfer unit), and the second timing is a timing at which the toner image is allowed not to be transferred to the medium by the secondary transfer roller.

Accordingly, with the image forming device according to the embodiment, image formation is not performed on a medium for which the process for the additional information fails. Such a medium on which no image is formed can be clearly indicated to the user that the medium is a medium on which the process for the additional information fails. The user can easily recognize that the medium is a medium on which the process for the additional information fails simply by visually confirming that no image is formed on the medium.

It is noted that, in the above-described embodiments, a digital multi-function peripheral including an electrophotographic printer is described as an example of the image forming device. However, the image forming device according to the embodiment may change the density of the image formed on the print medium according to the process result for the RFID tag provided on the incorporated print medium. That is, the above-described embodiment is not limited to being applied to an electrophotographic image forming device and may be applied to an image forming device using an image forming method other than the electrophotographic method.

The embodiment described above can be expressed as follows.

An image forming device comprising:

a communication device configured to communicate with a wireless tag;

an image former configured to form a developer image on a surface of a photoreceptor, the image former comprising:

a transferor configured to transfer the developer image to a medium provided with the wireless tag communicating with the communication device;

a transmitter configured to transmit the medium to the transferor; and a controller communicably coupled to the image former, the controller comprising:

a processor configured to control an operation of the transmitter;

wherein the transmitter transmits the medium at a first timing when communication with the wireless tag by the communication device is executed and transmits the medium at a second timing when the communication with the wireless tag by the communication device is not ended.

It is noted that, in the above-described image forming device, the additional information processing unit is, for example, a communication device communicating with a wireless tag provided on the medium, and the additional information is, for example, information stored in the wireless tag.

It is noted that, in the above-described image forming device, the additional information processing unit is, for example, a code reader reading a two-dimensional code attached to the medium, and the additional information is, for example, information indicated by the two-dimensional code.

Moreover, the embodiment described above can be expressed as follows.

An image forming device includes:

a reading unit reading a code;

an image forming unit forming a developer image on a surface of a photoreceptor;

a transfer unit transferring the developer image to a medium attached with the code;

a transmitting unit transmitting the medium to the transfer unit; and a processor controlling an operation of the transmitting unit so as to transmit the medium at a first timing when the reading of the code is normally executed and controlling the operation of the transmitting unit so as to transmit the medium at a second timing different from the first timing when the reading of the code is not normally ended.

It is noted that, in the above-described image forming device, the reading unit is, for example, a code reader reading the code attached to the medium, and the code is, for example, a two-dimensional code.

While several embodiments of the invention have been described, these embodiments have been presented as examples and are not intended to limit the scope of the invention. These embodiments can be implemented in various other forms, and various omissions, replacements, and modifications can be made without departing from the scope of the invention. These embodiments and modifications thereof are included in the scope and spirit of the invention, as well as the scope of the invention described in the claims and equivalents thereof.

While certain embodiments have been described, these embodiments have been presented by way of example only, and are not intended to limit the scope of the disclosure. Indeed, the novel embodiments described herein may be embodied in a variety of other forms: furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming device comprising:

a communication device configured to communicate with a wireless tag;

an image former configured to form a developer image on a surface of a photoreceptor via a transfer belt, the image former comprising:

a transferor configured to transfer the developer image from the transfer belt to a medium provided with the wireless tag communicating with the communication device;

a transmitter configured to transmit the medium to the transferor; and a controller communicably coupled to the image former, the controller comprising:

a processor configured to control an operation of the transmitter;

wherein when communication with the wireless tag by the communication device is not ended, the controller is configured to control the transmitter to:

stop the medium, and after the developer image has been transferred to the transfer belt by the image former and passes a transfer position of the transferor, transmit the medium preventing the developer image on the transfer belt from being transferred to the medium.

2. The device according to claim 1, further comprising an exposure device configured to form an electrostatic latent image by exposing the surface of the photoreceptor, wherein the processor controls an operation of the exposure device to stop the exposure when the communication with the wireless tag by the communication device is not ended.

3. The device according to claim 1, wherein the processor switches a first bias voltage applied to a transfer roller of the transferor to a second bias voltage, the second bias voltage preventing the transfer of the developer image if the communication with the wireless tag by the communication device is not ended.

4. The device according to claim 1, wherein, when the communication with the wireless tag by the communication device is not ended, the processor is configured to switch a first bias voltage applied to a transfer roller of the transferor after a trailing portion of the developer image passes the transfer position of the transferor to a second bias voltage for cleaning the transfer roller.

5. The device according to claim 4, wherein the processor restarts transmission of the medium by the transmitter after cleaning of the transfer roller is completed when the communication with the wireless tag by the communication device is not ended.

6. The device according to claim 1, wherein the communication device communicates with the wireless tag by reading from the wireless tag and writing to the wireless tag.

7. The device according to claim 1, wherein the processor is configured to separate the photoreceptor from the transfer belt when the communication with the wireless tag by the communication device is not ended.

8. A non-transitory computer-readable medium that stores a program for causing a computer of an image forming device to:

communicate, by a communication device, with a wireless tag, the communication device configured to read from the wireless tag and write to the wireless tag;

form, by an image former, a developer image on a surface of a photoreceptor via a transfer belt;

transfer, by a transferor, the developer image from the transfer belt to a medium provided with the wireless tag communicating with the communication device;

transmit, by a transmitter configured, the medium to the transferor; and control, by a controller, when communication with the wireless tag by the communication device is not ended, the transmitter to:

stop the medium, and after the developer image has been transferred to the transfer belt by the image former and passes a transfer position of the transferor, transmit the medium preventing the developer image on the transfer belt from being transferred to the medium.

9. The non-transitory computer-readable medium of claim 8, further causing the image forming device to:

form, by an exposure device, an electrostatic latent image by exposing the surface of the photoreceptor, control, by the controller, the exposure device to stop the exposure when the communication with the wireless tag by the communication device is not ended.

10. The non-transitory computer-readable medium of claim 8, further causing the image forming device to:

switch, by the controller, a first bias voltage applied to a transfer roller of the transferor to a second bias voltage, the second bias voltage preventing the transfer of the developer image if the communication with the wireless tag by the communication device is not ended.

11. The non-transitory computer-readable medium of claim 8, further causing the image forming device to:

switch, by the controller, a first bias voltage applied to a transfer roller of the transferor after a trailing portion of the developer image passes the transfer position of the transferor to a second bias voltage for cleaning the transfer roller when the communication with the wireless tag by the communication device is not ended.

12. The non-transitory computer-readable medium of claim 11, further causing the image forming device to:

restart, by the controller, transmission of the medium by the transmitter after cleaning of the transfer roller is completed when the communication with the wireless tag by the communication device is not ended.

13. The non-transitory computer-readable medium of claim 8, further causing the image forming device to:

communicate, by the communication device, with the wireless tag by reading from the wireless tag and writing to the wireless tag.

14. The non-transitory computer-readable medium of claim 8, further causing the image forming device to:

separate, by the controller, the photoreceptor from the transfer belt when the communication with the wireless tag by the communication device is not ended.

15. A method for operating an image forming device comprising:

communicating, by a communication device, with a wireless tag, the communication device configured to read from the wireless tag and write to the wireless tag;

forming, by an image former, a developer image on a surface of a photoreceptor via a transfer belt;

transferring, by a transferor, the developer image from the transfer belt to a medium provided with the wireless tag communicating with the communication device;

transmitting, by a transmitter configured, the medium to the transferor; and controlling, by a controller, when communication with the wireless tag by the communication device is not ended, the transmitter to:

stop the medium, and after the developer image has been transferred to the transfer belt by the image former and passes a transfer position of the transferor, transmit the medium preventing the developer image on the transfer belt from being transferred to the medium.

16. The method of claim 15, further comprising:

forming, by an exposure device, an electrostatic latent image by exposing the surface of the photoreceptor, controlling, by the controller, the exposure device to stop the exposure when the communication with the wireless tag by the communication device is not ended.

17. The method of claim 15, further comprising:

switching, by the controller, a first bias voltage applied to a transfer roller of the transferor to a second bias voltage, the second bias voltage preventing the transfer of the developer image if the communication with the wireless tag by the communication device is not ended.

18. The method of claim 15, further comprising:

switching, by the controller, a first bias voltage applied to a transfer roller of the transferor after a trailing portion of the developer image passes the transfer position of the transferor to a second bias voltage for cleaning the transfer roller when the communication with the wireless tag by the communication device is not ended, and restarting, by the controller, transmission of the medium by the transmitter after cleaning of the transfer roller is completed when the communication with the wireless tag by the communication device is not ended.

19. The method of claim 15, further comprising:

communicate, by the communication device, with the wireless tag by reading from the wireless tag and writing to the wireless tag.

20. The method of claim 15, further comprising:

separating, by the controller, the photoreceptor from the transfer belt when the communication with the wireless tag by the communication device is not ended.

* * * * *